United States Patent [19]

Numadate et al.

[11] Patent Number: 5,290,495
[45] Date of Patent: Mar. 1, 1994

[54] PROCESS FOR GRANULATING 2,2,6,6-TETRAMETHYLPIPERIDINE-CONTAINING LIGHT STABILIZER

[75] Inventors: Norimitsu Numadate, Misawa; Isao Nakamae, Hirakata; Hiroki Yamamoto, Niihama; Manji Sasaki, Nishinomiya, all of Japan

[73] Assignee: Sumitomo Chemical Company, Limited, Osaka, Japan

[21] Appl. No.: 757,926

[22] Filed: Sep. 12, 1991

[30] Foreign Application Priority Data

Sep. 13, 1990 [JP] Japan ................... 2-244786

[51] Int. Cl.$^5$ ................... B01J 2/20; C07D 211/00
[52] U.S. Cl. ................... 264/141; 23/313 R; 264/140; 252/401; 252/403; 546/188; 546/190
[58] Field of Search ............. 23/313 R; 546/190, 188; 252/401, 403; 264/330, 128, 141, 140

[56] References Cited

U.S. PATENT DOCUMENTS

| | | | |
|---|---|---|---|
| 4,055,618 | 10/1977 | Fujita et al. | 264/330 |
| 4,237,297 | 12/1980 | Rody et al. | 546/190 |
| 4,434,070 | 2/1984 | Lindner et al. | 264/143 |
| 4,719,037 | 1/1988 | Takahashi et al. | 252/401 |
| 4,725,634 | 2/1988 | Ishii et al. | 252/401 |
| 4,986,932 | 1/1991 | Disteldorf et al. | 252/403 |

FOREIGN PATENT DOCUMENTS

| | | | |
|---|---|---|---|
| 0040729 | 12/1981 | European Pat. Off. | |
| 375612 | 6/1990 | European Pat. Off. | 252/403 |
| 55-42208 | 3/1980 | Japan | |
| 62-110739 | 5/1987 | Japan | |
| 1-311066 | 12/1989 | Japan | 546/188 |
| 2157294 | 10/1985 | United Kingdom | 546/190 |

OTHER PUBLICATIONS

Browning, J. E. "Agglomeration: Growing Larger in Applications and Technology", Chemical Engineering, issue Dec. 4, 1967, pp. 147–150; 154–160.

English-language Translation of Japanese 62-110, 739, published May 1987.

Database WPIL, Week 9102, Derwent Publications Ltd., Londong, GB; AN 91-012476 & JP-A-2 286 857 (Adeka-Argus) Nov. 26, 1990.

Primary Examiner—Wayne Langel
Assistant Examiner—Peter T. DiMauro
Attorney, Agent, or Firm—Stevens, Davis, Miller & Mosher

[57] ABSTRACT

A process for producing granules of a 2,2,6,6-tetramethylpiperidine-containing light stabilizer, which comprises mixing a 2,2,6,6-tetramethylpiperidine-containing light stabilizer having a melting point of not less than 60° C. with a lubricant selected from the group consisting of water and an aqueous solution of an alcohol having 1 to 4 carbon atoms, and granulating the resultant mixture while pressure is applied thereto. The granular light stabilizer product has low dusting property and excellent free-flowing property.

7 Claims, No Drawings

PROCESS FOR GRANULATING 2,2,6,6-TETRAMETHYLPIPERIDINE-CONTAINING LIGHT STABILIZER

The present invention relates to a process for granulating 2,2,6,6-tetramethylpiperidine-containing light stabilizer to obtain a granular product.

A 2,2,6,6-tetramethylpiperidine-containing light stabilizer which is solid at ordinary temperature is generally produced by a process which comprises the steps of crystallizing a reaction product from an organic solvent, separating the resulting crystals by filtration, and drying the crystals. The so-obtained product is ordinarily in the form of a powder, and is often sold as it is. However, being liable to cause dust, such a powdery product has such handling problems that the working environment is polluted and workers may possibly breathe in dust.

As a technique to overcome the problems of a powdery product, there have heretofore been known a method comprising adding a small amount of a mineral oil or a mineral oil emulsion (usually called a "dedusting agent") to reduce dust scattering. When a dedusting agent is added to a powdery product, the dust scattering can be reduced. However, the powdery product containing a dedusting agent shows a decreased free-flowing property and it is therefore difficult to apply a recent, automatically operated weighing apparatus to such a product.

On the other hand, as a means for reducing dusting losses and rendering powders free-flowing, size enlargement processes are known. In the case of size enlargement processes, a binder such as PVA (polyvinyl alcohol), CMC (sodium carboxymethyl cellulose), starch, etc., are usually used. However, a 2,2,6,6-tetramethylpiperidine-containing light stabilizer is added to an organic material. Therefore, when a binder remains in the 2,2,6,6-tetramethylpiperidine-containing light stabilizer the performance of the stabilizer in the organic material becomes deteriorated. For this reason, the use of the binder is not desirable.

As a size enlargement process which uses no binder or which does not cause the binder to remain, there has been known a method in which the size enlargement is carried out while pressure is applied by, for example, compression or extrusion. In the compressive granulation method, the powdery raw material is fed between two rolls revolving inward at the same velocity, and the powdery raw material is compressed by the revolution of the rolls to obtain a plate-shaped product, which product is granulated with a roll-shaped mill, to obtain a granular product without using a binder. In the extrusive granulation method, the powdery raw material is mixed with a lubricant, and the resultant mixture is granulated with an extruder to obtain cylindrical granular product. The granular product is dried to remove the lubricant, thereby obtaining a commercial product.

It is an object of the present invention to provide a process for industrially advantageously producing 2,2,6,6-tetramethylpiperidine-containing light stabilizer granules, of which the dusting property is low and the free-flow property is excellent, by a granulation method in which pressure is applied on a powder.

According to the present invention, there is provided a process for producing granules of a 2,2,6,6-tetramethylpiperidine-containing light stabilizer, which comprises mixing a 2,2,6,6-tetramethylpiperidine-containing light stabilizer having a melting point of not less than 60° C. with water or an aqueous solution of an alcohol having 1 to 4 carbon atoms, and granulating the resultant mixture while pressure is applied thereto.

The 2,2,6,6-tetramethylpiperidine-containing light stabilizer as an object of the present invention refers to a compound having at least one piperidyl group of the formula,

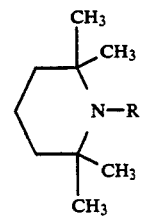

wherein R is hydrogen or a lower (e.g. $C_1$-$C_4$) alkyl.

Examples of the 2,2,6,6-tetramethylpiperidine-containing light stabilizer include the following compounds.

Bis(2,2,6,6-tetramethyl-4-piperidyl) sebacate,
2-Methyl-2-(2,2,6,6-tetramethyl-4-piperidyl)-amino-N-(2,2,6,6-tetramethyl-4-piperidyl)propionamide,
Bis(1,2,2,6,6-pentamethyl-4-piperidyl)-2-(3,5-di-tert-butyl-4-hydroxybenzyl)-2-n-butylmalonate,
Tetrakis(2,2,6,6-tetramethyl-4-piperidyl) butane-1,2,3,4-tetracarboxylate, and others.

In particular, the process of the present invention gives good granular products in the case of bis(2,2,6,6-tetramethyl-4-piperidyl) sebacate, and 2-methyl-2-(2,2,6,6-tetramethyl-4-piperidyl)amino-N-(2,2,6,6-tetramethyl-4-piperidyl)propionamide.

In the present invention, water or an aqueous solution of an alcohol having 1 to 4 carbon atoms is used as a lubricant for the granulation.

In general, organic solvents such as benzene, toluene, xylene, hexane, heptane, etc., are used as a lubricant for the granulation. These solvents do not adversely affect the performance of the 2,2,6,6-tetramethylpiperidine-containing light stabilizer, and it is hence possible to use them as a lubricant for granulating the light stabilizer. Of these organic solvents, in particular, xylene gives a granular product of the 2,2,6,6-tetramethylpiperidine-containing light stabilizer in comparatively good yield. Since, however, all of these organic solvents generate vapor in the step of drying the granular product and involve a risk of ignition, these organic solvents cannot be said to be industrially advantageous.

In contrast, in the process of the present invention using water or an aqueous alcohol solution, the risk of ignition in the drying step can be decreased to a great extent as compared with that in the process using any one of the above organic solvents. The "water" for use as a lubricant does not refer to a liquid which contains some positive additive but to a liquid consisting essentially of water. In the present invention, it is preferable to use an aqueous solution of an alcohol having 1 to 4 carbon atoms, and it is more preferable to use an aqueous solution of an alcohol having 1 to 3 carbon atoms.

The alcohol having 1 to 4 carbon atoms includes methyl alcohol, ethyl alcohol, isopropyl alcohol, n-butyl alcohol, etc. Of these, methyl alcohol and isopropyl alcohol are preferred.

When an aqueous alcohol solution is used as a lubricant, the concentration of the alcohol is preferably not more than 50% by weight, more preferably 15 to 25% by weight.

The amount of the lubricant selected from water and the aqueous alcohol solution for use is preferably not more than 50 parts by weight, more preferably 15 to 30 parts by weight, per 100 parts by weight of the 2,2,6,6-tetramethylpiperidine-containing light stabilizer.

A powder of the 2,2,6,6-tetramethylpiperidine-containing light stabilizer and the lubricant can be mixed with each other by means of any apparatus. For example, a blade-type mixing apparatus such as a kneader, a Henschel mixer, etc., may be used. Then, the resultant mixture is subjected to granulation procedure in which pressure is applied on the powder.

In the present invention, as a pressure compaction method for granulation, a variety of known methods such as a compressive granulation method, an extrusive granulation method, etc., can be applied.

In the compressive granulation method, the above mixture is fed between two rolls revolving inward at the same velocity, pulled into between the rolls, compressed by the revolution of the rolls, and taken out in the form of a plate. The plate-shaped product is granulated with a roll-shaped mill, etc., to obtain a granular product.

In the extrusive granulation method, the above mixture is fed to an extruder, and a cylindrical extrusion granular product is discharged through an outlet. The extrusion granulator is not critical, and there can be used, for example, a commercially available screw extruder, disk-shaped die horizontal-system extruder, basket-system granulator, etc. For example, when a screw-type front extruder is used as an extruder, the above mixture is fed onto a revolving screw, and carried toward an outlet with compression by the screw. The front extrusion outlet is provided with a die having predetermined orifices, through which the mixture is continuously extruded to form a cylinderical granular product.

The granular product obtained by the compressive granulation method has an irregular form and a broad particle size distribution. Therefore, the product is liable to have a poor appearance, and it is therefore not desired by users. On the other hand, the granular product obtained by the extrusive granulation method has a cylindrical form, and also has a uniform diameter and a uniform length. Therefore, it has a good appearance. For this reason, it would be rather preferable in the present invention to employ the extrusive granulation method.

The above-obtained granular product usually contains a lubricant. It is therefore preferable to further dry the granular product to remove the lubricant. For example, the granular product may be spontaneously dried by air drying. It is preferably dried by means of a known dryer such as a fluidized bed dryer or a direct heat tray dryer under such conditions as to remove the lubricant. For example, the granular product is dried by blowing thereagainst hot air having a temperature of not lower than 40° C. and not higher than the melting point of the light stabilizer as an object. In the case of the compressive granulation method, another method may be employed in which the plate-shaped product taken out from between the rolls is dried as it is, and the dried product is granulated.

It is preferable to prepare a commercial product having a particle size distribution, e.g. of about 500 μm to about 2,000 μm by further classifying the granular product. The classification can be carried out by a conventional method, e.g. by means of a standard sieve specified in JIS Z 8801, a vibrating sieve classifier, or the like. For example, the above-obtained granular product is classified with a standard sieve having a mesh size of 2.0 mm to separate coarse particles having a diameter greater than about 2,000 μm, and the remaining granular product is also classified with a vibrating sieve classifier to separate fine particles having a diameter smaller than about 500 μm.

According to the present invention, a granular product of a 2,2,6,6-tetramethylpiperidine-containing light stabilizer can be produced industrially advantageously, since a lubricant has little risk of ignition in the drying step. In the granular product obtained according to the process of the present invention, the particle size distribution is stable, the dusting property is low, and the free-flowing property is excellent. Further, being an agglomerate formed by agglomeration of powdery particles in the absence of a binder, etc., the present granular product exhibits excellent re-dispersibility when added to an organic material.

The present invention will be described further in detail below by reference to Examples, to which the present invention should not be interpreted to be limited. In Examples, "%" and "part" stand for "% by weight" and "part by weight" respectively unless otherwise specified.

The evaluation of dusting property in the Examples was based on the following method. Dusting property:

Each of granular products obtained in the Examples was subjected to a standard sieve to remove fine particles having a diameter of 500 μm or less. Then, the remaining granular product was charged into a thick glass bottle having a volume of 140 ml and shaken up and down for a certain period of time using a paint conditioner. Thereafter, the granular product shaken above was again subjected to the standard sieve to separate fine particles having a diameter of 500 μm or less, and the weight of such fine particles was measured. The ratio of the weight of such fine particles to the weight of the other particles was taken as a dusting property. A smaller value for a dusting property means a lower degree of generation of fine particles i.e. greater difficulty in destruction of particles of the granular product.

EXAMPLE 1

100 parts of bis(2,2,6,6-tetramethyl-4-piperidyl) sebacate and 25 parts of water were mixed with a kneader for 3 minutes. The resultant mixture was continuously granulated while it was fed to a disk-type die holizontal-system extrusive granulator in which a 2-mm thick die having orifices of 1 mm in diameter was set. The resultant granular product was dried with hot air having a temperature of 70° C. by means of a fluidized bed dryer.

The granular product obtained above had the following physical properties. Physical properties of the product:

| Bulk density | 0.41 g/cm$^3$ |
|---|---|
| Particle size distribution | 500 μm–2,000 μm: 84.2% |
| Dusting property | 6.3% (<500 μm) |

EXAMPLE 2

100 parts of bis(2,2,6,6-tetramethyl-4-piperidyl) sebacate and 20 parts of a 20% aqueous methanol solution were mixed with a kneader for 3 minutes. The resultant mixture was continuously granulated while it was fed to a disk-type die holizontal-system extrusive granulator in which a 2-mm thick die having orifices of 1 mm in diameter was set. The resultant granular product was dried with hot air having a temperature of 70° C. by means of a fluidized bed dryer.

The granular product obtained above had the following physical properties. Physical properties of the product:

| Bulk density | 0.42 g/cm$^3$ |
|---|---|
| Particle size distribution | 500 μm–2,000 μm: 92.3% |
| Dusting property | 8.6% (<500 μm) |

EXAMPLE 3

100 parts of bis(2,2,6,6-tetramethyl-4-piperidyl) sebacate and 25 parts of a 20% aqueous isopropyl alcohol solution were mixed with a kneader for 3 minutes. The resultant mixture was continuously granulated while it was fed to a disk-type die holizontal-system extrusion granulator in which a 2-mm thick die having orifices of 1 mm in diameter was set. The resultant granular product was dried with hot air having a temperature of 70° C. by means of a fluidized bed dryer.

The granular product obtained above had the following physical properties. Physical properties of the product:

| Bulk density | 0.46 g/cm$^3$ |
|---|---|
| Particle size distribution | 500 μm–2,000 μm: 98.2% |
| Dusting property | 1.6% (<500 μm) |

EXAMPLE 4

100 parts of bis(2,2,6,6-tetramethyl-4-piperidyl) sebacate and 25 parts of a 20% aqueous isopropyl alcohol solution were mixed with a kneader for 3 minutes. The resultant mixture was continuously granulated while it was fed to a disk-type die holizontal-system extrusion granulator in which a 2-mm thick die having orifices of 1 mm in diameter was set. The resultant granular product was dried with hot air having a temperature of 60° C. by means of an air flow type dryer.

The granular product obtained above had the following physical properties. Physical properties of the product:

| Bulk density | 0.40 g/cm$^3$ |
|---|---|
| Particle size distribution | 500 μm–2,000 μm: 96.8% |
| Dusting property | 2.2% (<500 μm). |

What is claimed is:

1. A process for producing granules of a light stabilizer selected from the group consisting of bis(2,2,6,6-tetramethyl-4-piperidyl)sebacate, 2-methyl-2-(2,2,6,6-tetramethyl-4-piperidyl)amino-N-(2,2,6,6-tetramethyl-4-piperidyl)propionamide and Bis(1,2,2,6,6-pentamethyl-4-piperidyl)-2-(3,5-di-tert-butyl-4-hydroxybenzyl)-2-n-butylmalonate, which comprises mixing the light stabilizer with a lubricant selected from the group consisting of an aqueous solution of methanol and an aqueous solution of isopropyl alcohol, and granulating the resultant mixture while pressure is applied thereto, wherein said light stabilizer has a melting point of not less than 60° C.

2. A process according to claim 1, wherein the granulation is carried out by extrusive granulation.

3. A process according to claim 1, wherein the aqueous alcohol solution has an alcohol concentration of not more than 50% by weight.

4. A process according to claim 1, wherein the aqueous alcohol solution has an alcohol concentration of 15 to 25% by weight.

5. A process according to claim 1, wherein the lubricant is used in an amount of not more than 50 parts by weight per 100 parts by weight of said light stabilizer.

6. A process according to claim 1, wherein lubricant is used in an amount of 15 to 30 parts by weight per 100 parts by weight of said light stabilizer.

7. A process according to claim 1, wherein a ratio of the granules having a particle size distribution of about 500 μm to about 2,000 μm is not less than about 92 parts by weight, per 100 parts by weight of the total granules of said light stabilizer.

* * * * *